May 5, 1959  E. N. SYLVESTER  2,884,697
SOLAR PENETRATION INDICATOR
Filed Jan. 17, 1955  5 Sheets-Sheet 1

INVENTOR.
Ernest Norman Sylvester
BY
*[signature]*
Atty.

May 5, 1959

E. N. SYLVESTER 2,884,697

SOLAR PENETRATION INDICATOR

Filed Jan. 17, 1955

INVENTOR.
Ernest Norman Sylvester
BY
Atty.

May 5, 1959 — E. N. SYLVESTER — 2,884,697
SOLAR PENETRATION INDICATOR
Filed Jan. 17, 1955 — 5 Sheets-Sheet 3

INVENTOR.
Ernest Norman Sylvester
BY
Atty.

May 5, 1959  E. N. SYLVESTER  2,884,697
SOLAR PENETRATION INDICATOR

Filed Jan. 17, 1955  5 Sheets-Sheet 4

INVENTOR.
Ernest Norman Sylvester
BY
Green Wells
Atty.

May 5, 1959

E. N. SYLVESTER 2,884,697

SOLAR PENETRATION INDICATOR

Filed Jan. 17, 1955

INVENTOR.
Ernest Norman Sylvester
BY
Atty.

United States Patent Office 2,884,697
Patented May 5, 1959

2,884,697

SOLAR PENETRATION INDICATOR

Ernest Norman Sylvester, Spokane, Wash.

Application January 17, 1955, Serial No. 482,040

10 Claims. (Cl. 33—1)

The present invention relates to improvements in a solar penetration indicator for determining the relationship of the sun to a building at any time.

The trend in modern architecture is to consider the effects of the sun as far as possible in determining the design and position of a proposed building. This is especially true when the proposed building is designed for a special purpose, such as would be the case in regard to schools, churches, and the like. In these buildings, the location of the sun with respect to the building during certain hours of the day, and certain months of the year is very important. The designer must so design the building that the windows therein afford the greatest illumination without undesirable direct penetration.

The common practice now is to make use of charts and graphs to determine the angle of the sun at a given time, and then to draw various sections through the building to investigate the penetration, and compute the size of awning or overhang necessary to produce the desired result. This process is both difficult and time consuming and adds considerable expense to the designing.

It is the principal purpose of my invention to produce a simple and economical instrument which can be used to investigate the relationship of the sun to a proposed building at any time of the day for any day of the year.

A further purpose of my invention is to provide such an instrument which will accurately determine the relationship of the sun to a proposed building for any position of the building at any point on the earth's surface.

My invention is adapted to be used in cooperation with a scale model of the portion of the building to be investigated. It comprises a plastic transparent cover member, supported on a base board. The model is oriented on the base underneath the transparent cover member, and sightings are taken through circles marked on the transparent cover member representing the position of the sun at various times.

The nature and advantages of my invention will appear more fully from the following description and the accompanying drawings wherein a preferred form of the invention is shown. It should be understood, however, that the drawings and description are illustrative only and are not intended to limit the invention except insofar as it is limited by the claims.

Figure 1:
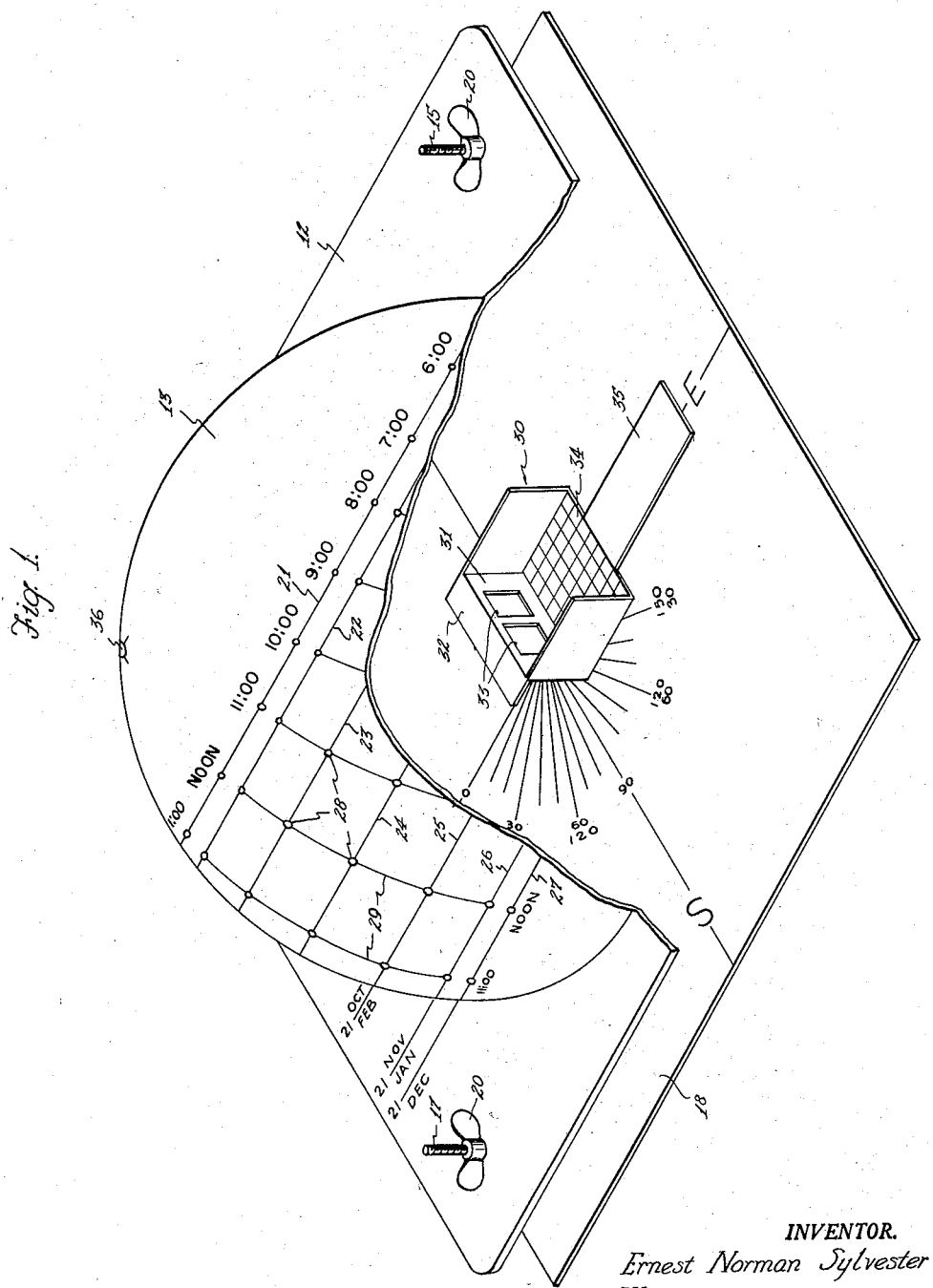
Figure 1 is a perspective view of the instrument with a portion of the dome broken away.
Figure 2:
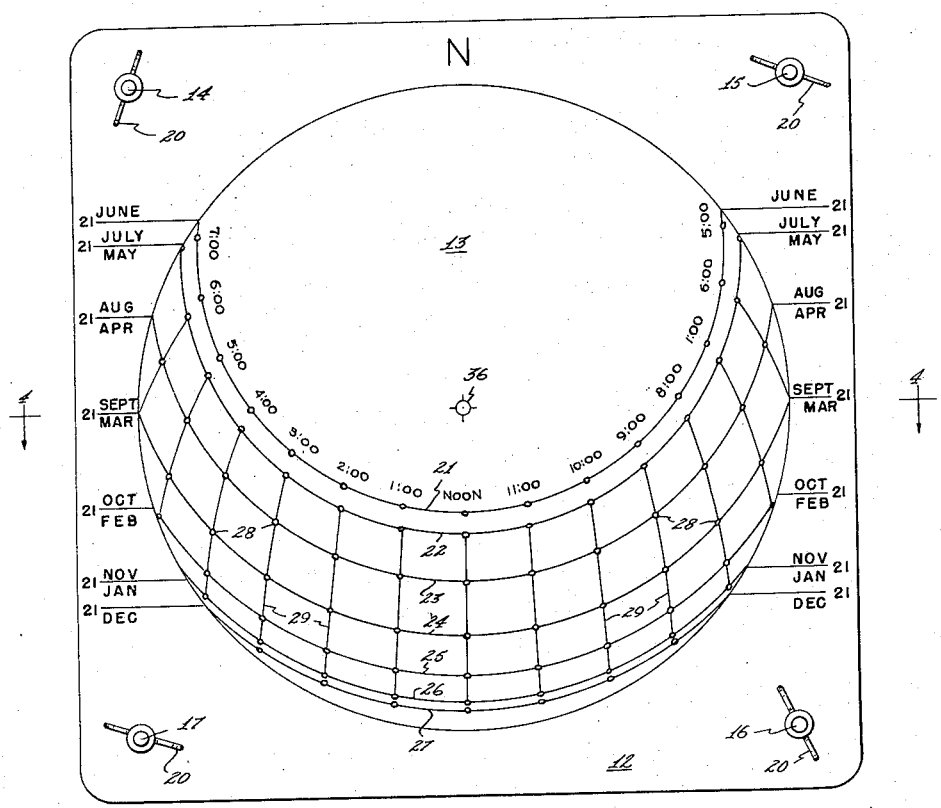
Figure 2 is a plan view of the instrument.
Figure 7:
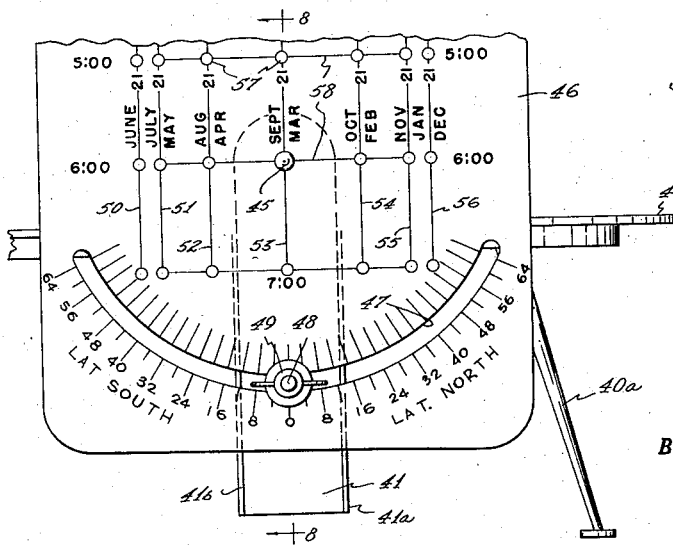
Figure 7 is a fragmentary elevational view of the modified form of the instrument.
Figure 3:
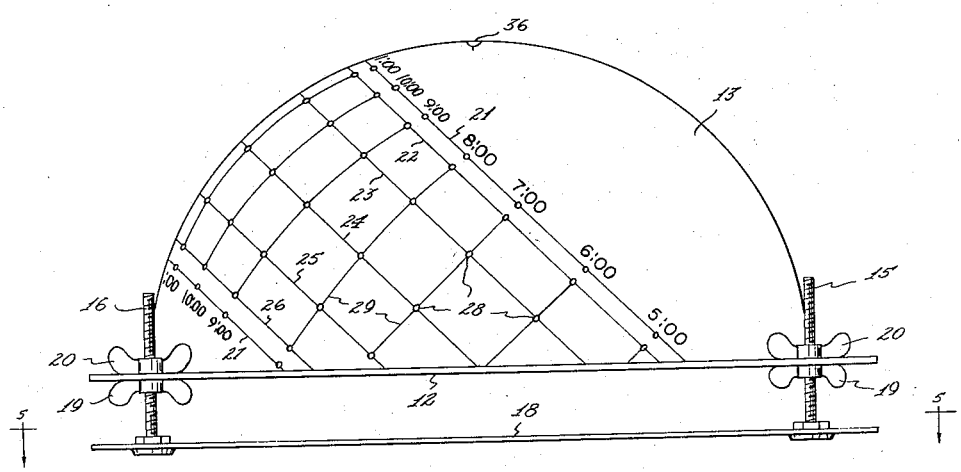
Figure 3 is a side elevational view of the instrument.

Referring now to the drawings and to Figures 1, 2 and 3 in particular, my invention consists of a square plate 12 of transparent plastic or a like substance at the center of which is formed a hemispherical dome 13. The plate 12 and dome 13 constitute a transparent cover member. The dome 13 is formed so that its center lies in the plane of the plate 12. The plate 12 is supported at its four corners by bolts 14, 15, 16 and 17 which extend upwardly from a square baseboard 18. Each of the bolts 14, 15, 16 and 17 has a lower wing nut 19 threaded thereon to support the plate 12, and an upper wing nut 20 threaded on above the plate 12 to clamp it into position. By adjusting the wing nuts 19 and 20 on the four bolts 14, 15, 16 and 17, the plate 12 and the dome 13 may be raised or lowered within limits with respect to the baseboard 18.

The dome 13 has marked thereon seven parallel circular lines 21–27 which extend upwardly from one side of the plate 12, across the surface of the dome 13, and down to the plate 12 at the opposite side. These lines 21–27 represent the paths of the sun during the daylight hours at certain times of the year with respect to the center of the dome 13. The line 21, closest to the top of the dome 13, represents the path of the sun with respect to the center on June 21 of any year. The line 22 represents the path on both May 21 and July 21. The line 23 represents the path on both August 21 and April 21. The line 24, a great circle, represents the path on September 21 and March 21. The line 25 represents the path on October 21 and February 21. The line 26 represents the path on November 21 and January 21. Finally, the line 27, nearest the plate 12, represents the path on December 21 of any year.

It will be noted that with this form of the invention, the lines 21–27 on the dome 13 represent the paths of the sun for one latitude only. The seven lines 21–27 represent the intersections of seven spaced apart parallel planes with the dome 13, and the angle at which these imaginary planes strike the plane of the plate 12 is a function of the latitude for which the instrument is accurate. I have found that the lines 21–27 will be accurate for a given latitude if the imaginary planes defining the lines strike the plane of the plate 12 at an angle equal to the complement of the latitude. For example, if the instrument is to be accurate for a latitude of 46°, then the angle at which the imaginary planes will be 90°–46° or 44°.

On each of the lines 21–27 are a series of circles indicated by the numeral 28. These circles represent the positions of the sun with respect to the center of the dome 13 at each hour of the day to which the line refers. Lines 29, perpendicular to the lines 21–27 extend between the circles 28 to connect the circles 28 which refer to the same hour on the seven lines 21–27. Adjacent the lines 21 and 27 the hours to which the circles refer are marked. In this manner, the position of the sun at any hour on the 21st day of any month may be quickly and accurately located on the surface of the dome 13. To determine the angle at which the sun's rays impinge on the earth's surface at the latitude for which the instrument is designed, one may look through the circle 28 and at the center of the dome 13. If the angle of the sun's rays is to be determined on any day of the month other than the 21st, one may approximate between two of the lines 21 to 27 to determine the position of the sun. One may also approximate between the hour positions to determine the location of the sun at any given time during the day. The circles 28 and lines 29 represent the local solar time, so they are accurate for any longitudinal position.

Figure 5:
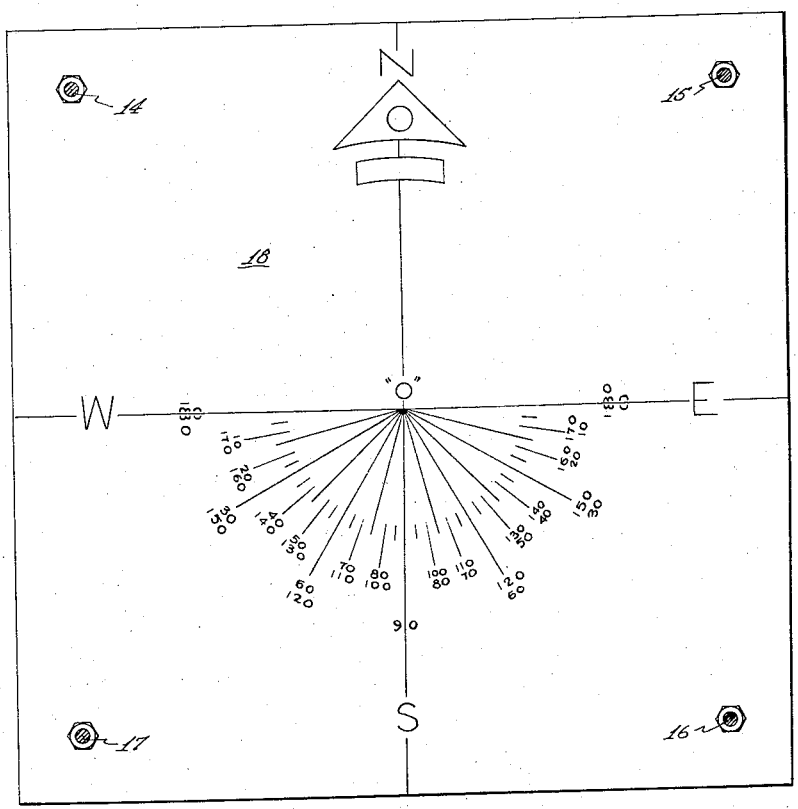
Figure 5 is a plan sectional view taken on the line 5—5 of Figure 3 and showing the base board.

The baseboard 18, upon which the dome 13 is mounted, is best shown in Figure 5. The baseboard 18 has inscribed thereon the letter "O" at the exact center. The letter "O" is positioned directly beneath the center of the dome 13. The four directions, i.e., north, south, east and west, are also marked on the baseboard for easy orientation of a model thereon. A scale of degrees from the point "O" is included on the southeast and southwest quadrants of the baseboard 18. With the baseboard so marked, any desired orientation of a model may easily and quickly be made.

The use of the instrument is very simple. The designer desiring to know the sun's effect on a portion of a proposed building first constructs a paper model, such as that shown at 30 in Figures 1 and 4, of the portions of the building to be investigated. For easiest operation the model should include a wall or bulkhead 31, the proposed overhang or awning 32, the proposed window 33, a floor portion 34 inside the window 33, and an aligning handle 35. The scale of the model may be on any scale suitable, and must only be limited to such an extent that the height of the model from the floor to the overhang does not exceed the length of the bolts 14, 15, 16 and 17. The floor of the model should be scaled off for easy reading, and the bulkhead should contain a vertical scale thereon. The model need not be complicated, as long as the height of the overhang 32 above the floor 34 and the distance it extends out are accurate. The distance from the overhang 32 to the top of the window 33 should also be accurate. The model may be constructed of paper or cardboard.

Figure 4:
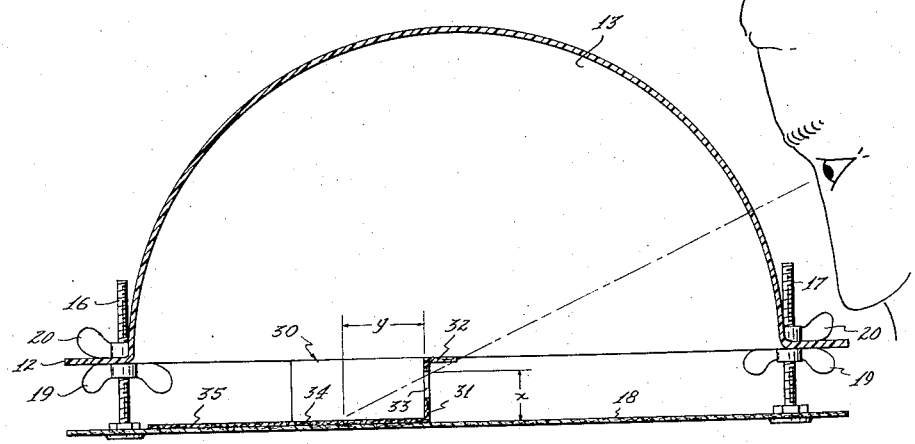
Figure 4 is a vertical sectional view of the instrument taken on the line 4—4 of Figure 2 illustrating the method by which it is used.

The model 30 is placed on the baseboard 18 under the dome 13 with a point on the outer edge of the overhang directly above the centerpoint "O" on the baseboard 18. To facilitate in aligning the model 30 there is a circle 36 marked on the dome directly above the centerpoint "O" on the baseboard 18. By looking down through the circle 36, and at the point "O" it is a simple matter to bring a point at the edge of the overhang 32 into position. The model is then oriented on the baseboard 18 in the exact direction that the portion of the building it represents will face, keeping it over the centerpoint "O," of course. When this has been completed, the wing nuts 19 and 20 at each corner are manipulated to bring the plate 12 into position so that it is situated in the same plane as the overhang 32. Since the center of the dome 13 lies in the plane of the plate 12, this will position the center of the dome 13 at the point on the overhang 32 directly above the centerpoint "O." Figure 4 shows the model 30 in this position.

Now, by sighting at the point on the overhang 32 at the center of the dome 13, through any of the circles 28, the height of the bulkhead and window exposed to direct solar radiation may be read from the scale on the bulkhead 31. This is the distance X on Figure 4. The depth of penetration through the window 33 may be read from the scale on the floor 34. This is the distance Y on Figure 4. It is but a simple matter to determine the sun's effect throughout the year on the building, and to determine the optimum location of the windows, overhangs, etc. on the proposed building. However, since the true angle of the sun's rays is only shown when one sights from the circles 28 to the center of the dome 13, care must be taken to insure that the point to be investigated on the edge of the overhang 32 is exactly positioned at the center of the dome 13.

If the portion of the building to be examined has no overhang, and the investigation is to determine the depth of penetration through a proposed window, then the model must be placed so that a point at the top edge of the window opening is in the center of the dome 13, and sightings must be made at this point.

The instrument is extremely useful since the construction of one model is all that is necessary to test the sun's effect for various orientations, and at any time of the day and year, and the accurate determination is made at a glance.

Figures 6 to 10 disclose a modified form of the invention. This form of the invention is a universal solar penetration indicator. The modified form of the invention may be adjusted to give accurate determination of the sun's effect at any desired latitude.

Figure 8:
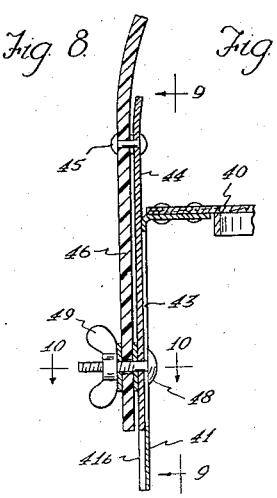
Figure 8 is a fragmentary sectional view taken on the line 8—8 of Figure 7.
Figure 9:
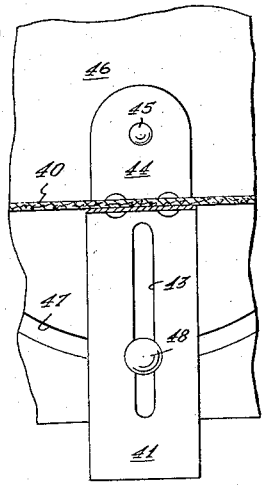
Figure 9 is a fragmentary sectional view taken on the line 9—9 of Figure 8.
Figure 10:
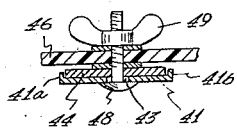
Figure 10 is a fragmentary sectional view taken on the line 10—10 of Figure 8.
Figure 6:
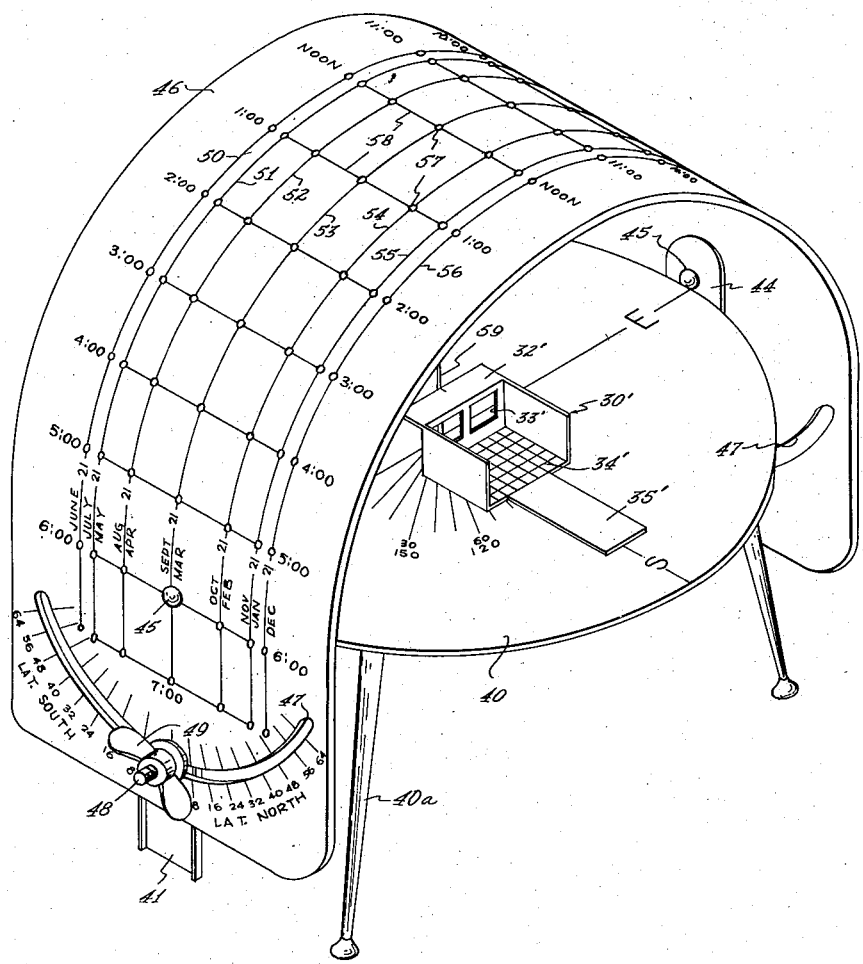
Figure 6 is a perspective view of a modified form of the instrument.

This form of the invention is best shown in Figure 6. It comprises a circular baseboard 40 having thereon the same marking as the baseboard 18, i.e., the several compass headings from the centerpoint. The baseboard 40 has two depending brackets 41 thereon at the east and west edges as shown in Figures 8, 9 and 10. The brackets 41 have out turned guide edges 41a and 41b, on their vertical portions, and each has a vertical slot 43 therein. A supporting strap 44 is positioned against the outer edge of each bracket 41 between the guides 41a and 41b. The straps 44 have pivot pins 45 at their upper ends which pivotally connect a semicylindrical transparent member 46, which constitutes the transparent cover member in this form of the invention. The member 46 has downwardly extending portions thereon at each end adjacent the straps 44. An arcuate slot 47 is formed at each end of the member 46 below the pivot pin 45 and has the pin 45 as its center. A bolt 48 at each side of the instrument extends through the arcuate slot 47, through the strap 44, and through the slot 43 in the bracket 41. A wing nut 49 threads on the bolt 48 to secure the members in place. When the wing nuts 49 at each side of the instrument are loosened, the transparent member 46 may be moved up and down with respect to the baseboard 40 by sliding the bolts 48 along the vertical slots 43 in the brackets 41. Thus, the straps 44 will be slid up or down with respect to the brackets 41 but due to the guides 41a and 41b, the straps will be maintained in a vertical position. The transparent member 46 may also pivot about the pins 45 when the nuts 49 are loosened, due to the arcuate slots 47. The baseboard 40 has legs 40a thereon to give the depending brackets 41 and the associated mechanism clearance to operate.

The transparent member 46 has marked thereon seven parallel lines 50–56 which correspond to the lines 21–27 on the dome 13. Circles 57 spaced along the lines 50–56 correspond to the circles 28, and perpendicular lines 58 connecting the circles 57 correspond to the lines 29. The member 46 is essentially the same as a section cut out of the dome 13, except that it is not spherical but cylindrical. The pivot pins 45 are placed at the 6:00 positions on the line 53, since these positions are diametrically opposed and at the transverse center of the member 46.

It will be noted that when the transparent member 46 is positioned vertically above the baseboard 40, an imaginary plane passing through the member 46 along the line 53 would intersect the baseboard 40 at right angles. Since the angle at which this plane strikes the baseboard is the complement of the latitude, this position refers to a latitude of 0 degrees. Pivotal movement of the member 46 toward the north or south edges of the baseboard will correspond to positions of latitude south or north of the equator. For example, tilting the member 10° from vertical toward the south edge of the baseboard 40 will adjust the instrument for a latitude of 10° north. A scale of latitude positions is marked along the arcuate slots 47 for easy adjustment of the member 46 in this manner. The bolts 48 act as index pointers to indicate the position of the member 46.

The operation of the modified form of the invention is similar to that of the main form. A vertical pin 59 at the centerpoint of the baseboard may be used to align the model 30' at the center of the baseboard 40 at the correct orientation. The wing nuts 49 are then loosened, and the member 46 and straps 44 are moved up or down until the pivot pins 45 are at the same height as the overhang 32' or whatever point is under investigation. This brings the center of the semicircular member 46 to the point under investigation. Next, the member 46 is pivoted to whatever latitude is desired, and the nuts 49 are tightened. All that remains is to sight through the member 46 from the desired date and time location at the point under investigation, and read the information from the scales on the model 30'.

Both forms of the invention represent very accurately the position of the sun at any hour on any day at a given latitude, and may be quickly and easily used to determine the effects of the sun on a proposed structure without necessitating the use of lengthy graphical solutions now employed.

It is believed that the nature and advantages of my invention appear clearly from the foregoing description.

Having thus described my invention, I claim:

1. An instrument for indicating the extent of solar penetration into a building through a window or beneath an overhanging eave or other part thereof, comprising a base board adapted to support a scale model of the part of the building in which the solar penetration is to be determined, said base board having a center marking and direction indicating markings thereon, means to support a transparent cover member over the markings for vertical movement above the base board, a transparent cover member carried by said means, said member having its axis spaced above the base board and having a base sighting angle indicating line thereon delineating the path along which the sun's rays would pass during a day to the part of the scale model directly over said center marking at the equinox (March 21 and September 21) at a certain latitude, the member having other sight lines thereon parallel to the first named line delineating paths along which the sun rays would pass for periods before and after equinox at such latitude, so that the extent of sun penetration for any of the periods is located by sighting from the corresponding sight line across the part of the scale model immediately above the center marking to the interior of the scale model.

2. An instrument for indicating the extent of solar penetration into a building through a window or beneath an overhanging eave or other part thereof, comprising a base board adapted to support a scale model of the part of the building in which the solar penetration is to be determined, said base board having a center marking and direction indicating markings thereon, means to support a transparent cover member over the markings for vertical movement above the base board, a transparent cover member carried by said means at an axis of the member, said member having its axis spaced above the base board and having a base sighting angle indicating line thereon delineating the path along which the sun's rays would pass during a day to the part of the scale model directly over said center marking at the equinox (March 21 and September 21) at a certain latitude, the member having other sight lines thereon parallel to the first named line delineating paths along which the sun rays would pass for periods before and after equinox at such latitude, so that the extent of sun penetration for any of the periods is located by sighting from the corresponding sight line across the part of the scale model immediately above the center marking to the interior of the scale model, said transparent cover member being pivotally supported by said means for angular adjustment on its axis to fit different latitudes.

3. An instrument for indicating the extent of solar penetration into a building through a window or beneath an overhanging eave or other part thereof, comprising a base board adapted to support a scale model of the part of the building in which the solar penetration is to be determined, said base board having a center marking and direction indicating markings thereon, means to support a cover member thereon spaced above the markings, a cover member carried by said means, the cover member comprising a dome having supporting portions projecting from it, and said means including clamping devices engaging said portions and adjustable to vary the height of said cover member above the base board, said dome having a base sighting angle indicating line of view stations thereon through which the center marking on the base board is visible, said line of view stations delineating the path along which the sun's rays would pass during the day to the part of the scale model directly over said center marking at the equinox at a certain latitude, the dome having other sighting angle indicating lines of view stations thereon parallel to the first named line of view stations on both sides of said first named line of view stations delineating paths along which the sun rays would pass to the scale model directly over said center marking for periods before and after equinox whereby the extent of solar penetration of the building can be found on the scale model by sighting through a view station on the line corresponding to the period.

4. An instrument for indicating the extent of solar penetration into a building through a window or beneath an overhang or other part, comprising a base board adapted to support a scale model of the part of the building in which the solar penetration is to be determined, said base board having a center mark thereon, a cover member positioned above the base board, said cover member having indicating marks thereon representing points on the cover member through which the sun's rays would pass at representative times of the year at a certain latitude with respect to the intersection point of a line perpendicular to the base board and extending through the center mark and a line parallel to and spaced above the base board, the cover member having transparent portions therein adjacent the marks whereby the angle of the sun's rays impinging upon the intersection point may be determined by sighting from one of the marks to the intersection point, and means supporting said cover member above the base board for vertical movement, whereby to raise and lower the intersection point to match the level of a point on a scale model at which the angle of the sun's rays and the solar penetration are to be determined.

5. An instrument for indicating the extent of solar penetration into a building through a window or beneath an overhang or other part, comprising a base board adapted to support a scale model of the part of the building in which the solar penetration is to be determined, said base board having a center mark thereon, a cover member positioned above the base board, said cover member having indicating lines thereon delineating the paths on the cover member along which the sun's rays would travel with respect to the intersection point of a line parallel to the base board extended between two points on the cover member and a perpendicular line through the center mark during representative days of the year at a certain latitude, the cover member having transparent portions therein whereby the angle of the sun's rays impinging on said intersection point may be determined by sighting from a point on one of the indicating lines to the intersection point, and means supporting said cover member above the base board for vertical movement, whereby to raise and lower the intersection point to match the level of a point on a scale model at which the angle of the sun's rays and the solar penetration are to be determined.

6. An instrument for indicating the extent of solar penetration into a building through a window or beneath an overhang or other part, comprising a base board adapted to support a scale model of the part of the building in which the solar penetration is to be determined, said base board having a center mark thereon, said base board having the four major compass points of north, south, east and west marked thereon with respect to the center mark, a cover member positioned over the base board, said cover member having the central portion thereof raised with respect to the edges thereof above the east and west compass points, said cover member having indicating lines thereon delineating the paths on the cover member along which the sun's rays would travel with respect to the intersection point of a perpendicular line extending from the center mark and a line parallel to the base board and extending east and west with respect thereto between points on the cover member on representative days of the year at a certain latitude, said last named points representing the respective positions of the sun with respect to the intersection point at sunrise and sunset at the equinox, the cover member having transparent portions thereon adjacent said indicating lines whereby the angle of the sun's rays impinging upon the intersection point may be determined by sighting from a point on one of the indicating lines to the intersection point, and means supporting said cover member above the base board for vertical movement whereby to raise and lower the intersection point to match the level of a point on a scale model at which angle of the sun's rays and the solar penetration are to be determined.

7. An instrument for indicating the extent of solar penetration into a building through a window or beneath an overhang or other part, comprising a base board adapted to support a scale model of the part of the building in which the solar penetration is to be determined, said base board having a center mark thereon, a cover member positioned above the base board, said cover member having indicating marks thereon representing points on the cover member through which the sun's rays would pass with respect to the intersection point of a line parallel to the base board and extended between two points on the cover member and a perpendicular line through the center mark at representative times on representative days of the year at a certain latitude, the cover member having transparent portions therein whereby the angle of the sun's rays impinging on said intersection point may be determined by sighting from one of the marks to the intersection point, and means supporting said cover member above the base board for vertical movement, whereby to raise and lower the intersection point to match the level of a point on a scale model at which the angle of the sun's rays and the solar penetration are to be determined.

8. An instrument for indicating the extent of solar penetration into a building through a window or beneath an overhang or other part, comprising a base board adapted to support a scale model of the part of the building in which the solar penetration is to be determined, said base board having a center mark thereon, said base board having the four major compass points of north, south, east and west marked thereon with respect to the center mark, a cover member having the central portion thereof raised with respect to the edges thereof above the east and west compass points, said cover member having indicating points thereon representing points on the cover member through which the sun's rays would pass at representative times during representative days of the year at a certain latitude, with respect to the intersection point of a line perpendicular to the base board and extending from the center mark and a line parallel to the base board and extending east and west with respect thereto between points on the cover members, said last named points representing the respective positions of the sun with respect to the intersection point at sun-rise and sunset at the equinox, the cover member having transparent portions thereon adjacent said indicating marks whereby the angle of the sun's rays impinging upon the intersection point may be determined by sighting from one of the marks to the intersection point, and means supporting said cover member above the base board for vertical movement whereby to raise and lower the intersection point to match the level of a point on a scale model at which angle of the sun's rays and the solar penetration are to be determined.

9. An instrument for indicating the extent of solar penetration into a building through a window or beneath an overhang or other part, comprising a base board adapted to support a scale model of the part of the building in which the solar penetration is to be determined, said base board having a center mark thereon, said base board having the four major compass points of north, south, east and west marked thereon with respect to the center mark, a cover member positioned over the base board, said cover member having the central portion thereof raised with respect to the edges thereof above the east and west compass points, said cover member having indicating lines thereon delineating the paths on the cover member along which the sun's rays would travel with respect to the intersection point of a perpendicular line extending from the center mark and a line parallel to the base board and extending east and west with respect thereto between points on the cover member on representative days of the year at a certain latitude, said last named points representing the respective positions of the sun with respect to the intersection point at sun-rise and sunset at the equinox, the cover member having transparent portions thereon adjacent said indicating lines whereby the angle of the sun's rays impinging upon the intersection point may be determined by sighting from a point on one of the indicating lines to the intersection point, and means supporting said cover member above the base board for vertical movement whereby to raise and lower the intersection point to match the level of a point on a scale model at which angle of the sun's rays and the solar penetration are to be determined, said cover member being pivotally secured to said last named means on an axis coinciding with said line extending east and west with respect to the base board and extending between the points representing the positions of the sun at sunrise and sunset on the equinox whereby to vary the angular relation of the cover with the base board to allow the indicating lines to fit different latitudes.

10. An instrument for indicating the extent of solar penetration into a building through a window or beneath an overhang or other part, comprising a base board adapted to support a scale model of the part of the building in which the solar penetration is to be determined, said base board having a center mark thereon, a transparent cover member positioned above the base board, said cover member being substantially semi-cylindrical and having its concave surface facing the base board, said cover member having indicating lines thereon delineating the paths on the cover member along which the sun's rays would travel on representative days of the year at a certain latitude with respect to the intersection point of a line perpendicular to the base and extending through the center mark and a line parallel to the base board and passing through points on the cover member representing the positions of the sun with respect to said intersection point at sunrise and sunset at the equinox, each of said indicating lines having marks thereon representing positions of the sun with respect to the intersection point at representative hours so that the angle of the sun with respect to the intersection point may be determined by sighting at the intersection point from one of the hour marks, and means supporting the cover member above the base board for vertical movement whereby to raise and lower the intersection point to match the level of a point on a scale model at which the angle of the sun's rays and the solar penetration are to be determined, the cover member being pivoted to said last named means on an axis extending through the points on the cover representing the position of the sun with respect to the intersection point at sunrise and sunset at the equinox, whereby to vary the angular relation of the cover member with respect to the board to allow the indicating lines to fit different latitudes.

References Cited in the file of this patent

UNITED STATES PATENTS

| | | |
|---|---|---|
| 89,585 | Johnson | May 4, 1869 |
| 1,928,025 | McEwan | Sept. 26, 1933 |
| 2,372,487 | Hagner | Mar. 27, 1945 |
| 2,612,693 | Schonstedt | Oct. 7, 1952 |
| 2,715,273 | Dodd et al. | Aug. 16, 1955 |

FOREIGN PATENTS

| | | |
|---|---|---|
| 216,316 | Germany | Nov. 9, 1909 |
| 370,510 | Great Britain | Apr. 14, 1932 |